2,777,888

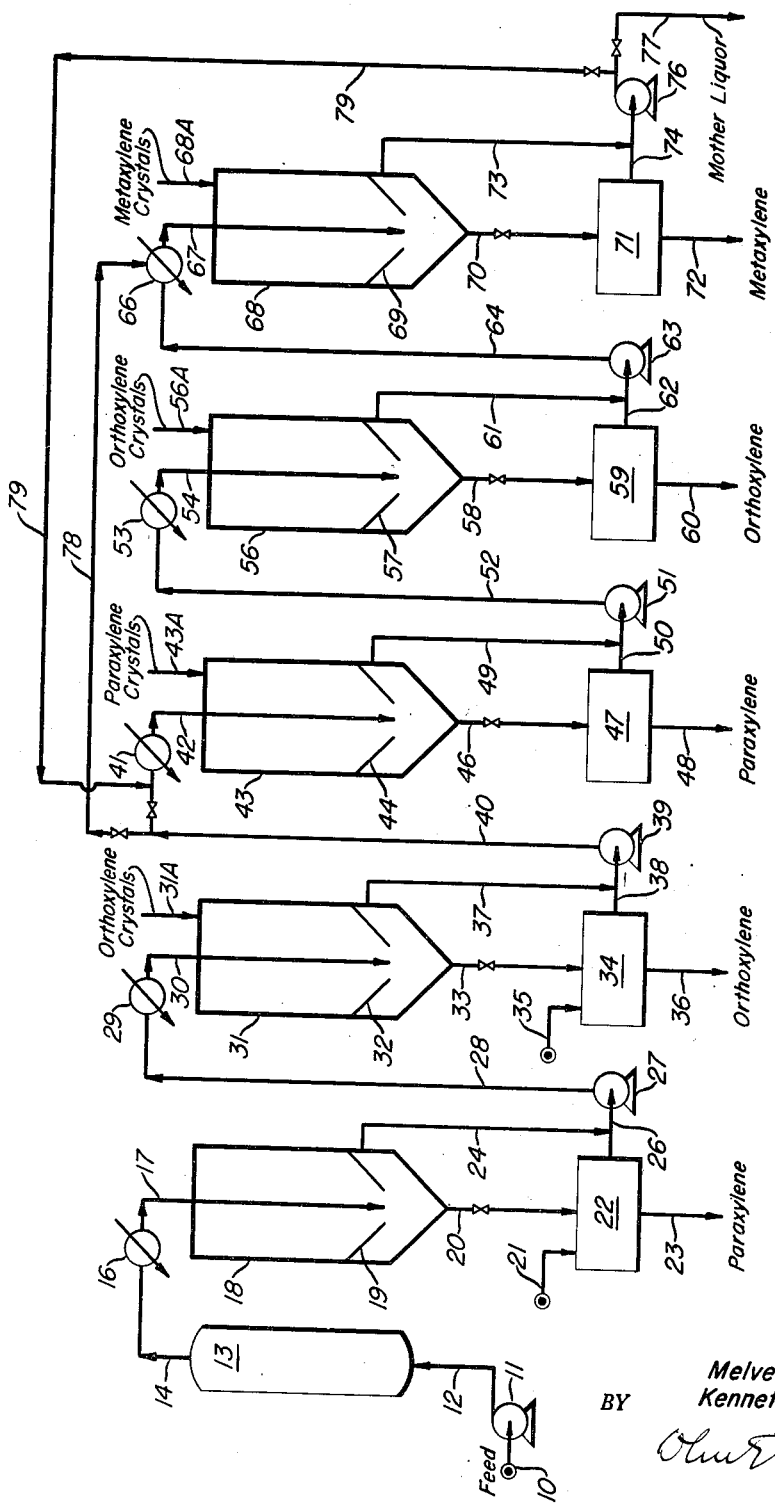

SEPARATION OF RECOVERY OF XYLENE ISOMERS

Melvern C. Hoff, Highland, and Kenneth C. Peterson, Hammond, Ind., assignors to Standard Oil Company, Chicago, Ill., a corporation of Indiana Application May 1, 1953, Serial No. 352,434

3 Claims. (Cl. 260—674)

This invention relates to a process of recovering and separating xylene isomers especially from mixtures of the same with ethylbenzene and paraffins boiling in substantially the same range. The invention has particular reference to a process for separating individual xylene isomers from each other and from such mixtures by fractional crystallization.

Xylenes are found in substantial quantities in coke-oven light oil and certain virgin and reformed petroleum naphthas. It has been the practice in separating xylene isomers either to use chemical methods or to distill para- and meta-xylene, ethylbenzene, and some paraffins from a fraction containing the isomers, ethylbenzene and paraffins, thus separating ortho-xylene as a distillation bottoms product in admixture with some of the paraffins, and to separate para-xylene from the distillate by fractional crystallization. Methods have been devised which do not require a distillation step but these provide for separation of only the single isomer, para-xylene, and in a yield limited to only that amount theoretically obtainable in a single step from a mixture of xylenes, ethylbenzene and paraffins, as governed by the phase equilibria as diagrammed, for example, by Kravchenko in Acta Physicochimica (U. R. S. S.), vol. 20, 567–77 (1945) for a mixture of the xylene isomers and ethylbenzene. It is a primary object of the present invention to provide a method for the recovery and separation of each of the separate xylene isomers solely by a system of fractional crystallization of a mixture of the isomers, ethylbenzene and paraffins. It is a further object of the invention to recover individual xylene isomers, such as para-xylene and ortho-xylene, in yields substantially in excess of that theoretically obtainable by a single fractional crystallization according to the phase relationship of the system. The invention has for other objects such other advantages or results as will be found in the specification and claims hereinafter made.

The present invention comprises a crystallization system which consists of cooling a mixture of the xylene isomers and removing the separate isomers, in substantially pure form, in several crystallization stages, usually induced by seeding, while retaining other isomers or eutectic mixtures in supercooled solution, in every case shifting to the crystallization of another isomer before cooling down as low as the spontaneous crystallization temperature of any supercooled component. After crystallization and separation from the mother liquor of para-xylene, which substantially always is the first isomer crystallized from a crude mixture of xylene isomers, the second component is removed. The mother liquor is cooled to a temperature below the equilibrium crystallization temperature of the second component to be removed but above the spontaneous crystallization temperature of any other component of the mixture and is seeded with a crystal of the second component. At this point the mother liquor may be supersaturated with both other isomers in which case the seeded component is the one which crystallizes. After crystallization of para-xylene and the next seeded component, or a plurality of cycles of such crystallizations, the third isomer is crystallized. Its crystallization is substantially always aided by seeding this second mother liquor (from the para- and next-removed-component crystallizations) with a crystal of the third isomer, usually meta-xylene.

The mixture of xylene isomers, ethylbenzene and paraffins boiling in the same boiling range is cooled to a temperature between about −75° and −90° C., and is maintained at this temperature for a sufficient time to effect crystallization of the para-xylene in an amount larger than the excess of para-xylene over its eutectic proportion in the mixture, thus taking advantage of the supercooling properties of ortho- and meta-xylene. The usual equilibrium concentration of xylene mixtures obtained from the reforming of petroleum is such that para-xylene and usually ortho-xylene is in excess of the ternary eutectic mixture, i. e., upon cooling para-xylene will first crystallize out, and upon further cooling, ortho-xylene and later meta-xylene will become saturated or supersaturated and also crystallize. All of the xylene isomers will supercool and of the isomers, meta-xylene shows the strongest supercooling characteristics. Thus, even when meta-xylene is present in a proportion greater than its ternary eutectic proportion it will stay in solution even after ortho-xylene, when seeded, is crystallized out.

In operation of our invention, therefore, when the spontaneous crystallization temperature of ortho-xylene is approached (in the said equilibrium compositions, about −90° C.), in which case usually about two-thirds of the para-xylene has been recovered, the para-xylene crystals are separated from the mother liquor and the mother liquor from which para-xylene crystals have been substantially completely separated is then cooled and seeded or inoculated with ortho-xylene to effect a crystallization of this isomer.

Ortho-xylene is crystallized by cooling the mother liquor to a temperature between about −85° and −95° C. and preferably between about −88° and −93° C. and seeding the cooled mother liquor with an ortho-xylene crystal. This cooling of the mother liquor will effect a supercooling with respect to para-xylene and meta-xylene but the minimum temperature reached by this cooling of the mother liquor is kept above the spontaneous crystallization temperature of para- or meta-xylene, usually about −94° to −98° C. After separation of ortho-xylene crystals from the mother liquor, the cycle can be repeated and this secondary mother liquor from the ortho-xylene crystallization is cooled to a temperature between about −98° and −104° C. and is seeded with para-xylene. This cooling and inoculation step will effect the crystallization of a substantial additional quantity of pure para-xylene because the intermediate removal of the next saturated xylene isomer, usually ortho-xylene, provides a secondary mother liquor from which further quantities of para-xylene can be crystallized before the mother liquor becomes so saturated with respect to another isomer that its spontaneous crystallization temperature will have been reached. The additional para-xylene recovered in this manner is separated from the mother liquor of this crystallization, this second crystallization of para-xylene lowers its concentration in the mother liquor so that ortho-xylene can again be separated by a second crystallization of this isomer. The mother liquor from the second crystallization of para-xylene is separated from para-xylene crystals and is cooled to a temperature between about −105° and −110° C. and is seeded with ortho-xylene; a very substantial portion of the remainder of this isomer is recovered and separated from the remaining mother liquor. Thus, the theoretical barrier to maximum recovery of xylene isomers by crystallization which was formerly established by the spontaneous crystallization temperature of the next saturated component has been removed and we are able to obtain yields of the individual xylene isomer crystals in excess of that heretofore recoverable in known crystallization systems.

The mother liquor from the first cycle and especially from the second cycle of para-ortho crystallization, if the cycle is repeated, contains meta-xylene in considerable excess of its eutectic proportion with ortho-xylene, para-xylene, and/or ethylbenzene. Meta-xylene in very substantial yield can be crystallized from the mother liquor from either one or more of para-ortho crystallizations by cooling to a temperature between about −90° and −110° C., and seeding with meta-xylene. When meta-xylene is crystallized and separated from mother liquor after a cycle of para-ortho-xylene crystallizations, the mother liquor from the meta-xylene crystallization can be employed in a second para-ortho cycle.

The crystallization temperatures of individual xylene isomers or of eutectic mixtures of the isomers with one another or with ethylbenzene or other aromatic constituents of crude xylene stocks can be defined as follows: the normal crystallization temperature is the temperature under stable equilibrium conditions at which a single isomer or eutectic will crystallize in the absence of extraneous liquids which would serve to lower the crystallization temperature; the equilibrium temperature is the temperature at which a single isomer or a eutectic mixture will crystallize under stable equilibrium conditions in the presence of ethylbenzene or paraffins or other liquid which will lower the crystallization temperature of the isomer or eutectic; and the spontaneous crystallization temperature is the temperature at which an individual isomer will crystallize regardless of its tendency to supercool or to exist as a liquid in a meta-stable condition. The spontaneous crystallization temperature is considerably lower than the equilibrium temperature for the same mixture, since spontaneous crystallization usually does not occur until after all possibilities of supercooling or of maintaining a meta-stable condition have been exhausted. Of the xylene isomers, para-xylene has the least tendency and meta-xylene the greatest tendency to supercool (to remain in meta-stable solution over the widest temperature range).

In addition to the above intermittent fractional crystallization of meta-xylene from the mother liquor which can be employed after one or more cycles of para-ortho-xylene crystallizations, the meta-xylene can also be removed from the crude xylene mixture by extraction with HF–BF₃ complex at any time in the process of separation of the isomers. For example, the crude C₈ aromatic mixture can be introduced directly into a HF–BF₃ extraction unit wherein the meta-xylene will be removed at temperatures below −25° C. and above −40° C. At more elevated temperatures, disproportionation of components of the xylenes mixture will occur. The mixture from which meta-xylene has been extracted is then passed to a para-xylene crystallizer in which the mixture is cooled to a temperature below about −68° C., the normal ortho-para eutectic crystallization temperature, but above about −76° C., the spontaneous crystallization temperature of ortho-xylene in the mixture. The para-xylene is then separated from the solution by centrifugation, filtration, settling, pressing, or the like. The mother liquor is then passed to a second crystallization where it is maintained at above about −74° to −80° C., which is approximately the spontaneous crystallization temperature of the para-xylene remaining in the mixture. The mixture is seeded with ortho-xylene, and ortho-xylene is crystallized from the mother liquor and is separated therefrom. Here again the cycle of para- and ortho-xylene crystallization can be repeated. Ethylbenzene may be recovered and purified by distillation of the remaining mother liquor after one or more cycles of para-ortho crystallization.

In operation of the xylene-isomer separation process of the present invention, cooling of the xylene feed can be provided by a multiple stage system refrigerated, such, for example as that diagrammatically illustrated in the accompanying drawing. The feed stock to this system generally will not vary greatly in relative concentration of the xylene isomers from their thermodynamic equilibrium concentration (Bureau of Standards; Journal of Research, 39, No. 4, pp. 303–308 (1937)) and will contain about 10 to 20 percent of para-xylene, about 15 to 25 percent of ortho-xylene, about 30 to 40 percent of meta-xylene, about 20 to 30 percent of ethylbenzene, and about 5 to 10 percent of paraffins and a trace of C₉ aromatics.

The feed stock is flowed from a source 10 and is pumped by pump 11 through line 12 into a drier 13 in which it is dried with, for example, calcium chloride. The dried feed flows from drier 13 through a line 14 into a cooler 16 in which the feed stock is cooled to a temperature that is just above the highest spontaneous crystallization temperature of the other components in the mixture, in the present case between −75° and −90° C. The cooled mixture is flowed from the cooler 16 through line 17 into para-xylene crystallizer 18, which is preferably an Oslo-type crystallizer having baffles 19 beneath which a slurry of para-xylene crystals settle. The said slurry is withdrawn through valved line 20 and is introduced into centrifuge 22 in which the para-xylene crystals are separated from mother liquor and are washed in a fresh feed, melted para-xylene or an extraneous washing liquid introduced into the centrifuge through line 21. Para-xylene product is withdrawn through line 23 to storage or further purification means (not shown). Mother liquor can be withdrawn from the settling zone beneath the baffles 19 and flowed through line 24 to line 26. Mother liquor is also withdrawn from the centrifuge 22 through line 26 and is pumped by pump 27 through line 28 to cooler 29 and line 30 into crystallizer 31, which is of substantially the same construction as that of crystallizer 18. Crystallizer 31 may also be provided with baffles 32.

Mother liquor from the first crystallization step is cooled in cooler 29 to a temperature between about −85° and −95° C. and is seeded in the crystallizer with ortho-xylene crystals introduced through inlet 31a. A slurry of crystals and mother liquor is withdrawn from crystallizer 31 through valved line 33 into centrifuge 34 in which the ortho-xylene crystals are separated from mother liquor and withdrawn through line 36 to further purifying means, to storage, or to synthesis processes, such as the production of phthalic anhydride, directly employing the ortho-xylene. The crystals can be washed in the centrifuge 34 by fresh feed, liquid ortho-xylene or some extraneous wash liquid such as toluene, introduced therein through line 35. Mother liquor is withdrawn from crystallizer 31 through line 37 and from centrifuge 34 through line 38 and is pumped by pump 39 through valved line 40 into cooler 41. The mother liquor is cooled to a temperature between about −98° and −104° C. in the cooler 41 and is withdrawn therefrom through line 42, is introduced into crystallizer 43 having internal baffles 44. The cooled mother liquor in crystallizer 43 is seeded with para-xylene crystals introduced through inlet 43a and the resultant slurry of para-xylene crystals and mother liquor settles in crystallizer 43 and is withdrawn therefrom through valved line 46. The slurry is introduced from the valved line 46 into centrifuge 47 wherein the para-xylene crystals are separated from the mother liquor and are washed in the manner hereinbefore described for the first- recovered para-xylene. The para-xylene crystals are withdrawn through line 48 to storage means or the like.

Mother liquor from this para-xylene crystallization withdrawn from beneath baffles 44 in crystallizer 43 and from centrifuge 47 through line 50, is pumped by pump 51 through line 52 into cooler 53. The mother liquor from this second para-xylene crystallization is cooled in the cooler 53 to a temperature between about −105° and −110° C. and is then delivered through line 54 into crystallizer 56 having internal baffles 57. The cooled mother liquor in crystallizer 56 is seeded with ortho-xylene crystals introduced through line 56a and the resultant slurry of ortho-xylene crystals and mother liquor settles in the crystallizer and is withdrawn therefrom through valved line 58 into centrifuge 59. The ortho-xylene crystals in centrifuge 59 are separated from the mother liquor and are washed in the manner described for the first-recovered ortho-xylene and the separated and washed ortho-xylene is withdrawn through line 60 to storage means or the like (not shown). Mother liquor withdrawn from crystallizer 56, from beneath baffles 57 through line 61 and from centrifuge 59 through line 62, is pumped by pump 63 through valved line 64 into cooler 66.

Mother liquor from the second ortho-xylene crystallization is cooled in the cooler 66 to temperature between about −90° and −110° C. and is flowed therefrom through line 67 into crystallizer 68 having internal baffles 69. The cooled mother liquor is seeded, in the crystallizer, with meta-xylene crystals introduced through inlet 68a. A meta-xylene crystal slurry settles in the crystallizer 68 and is withdrawn through valved line 70 to centrifuge 71 in which the meta-xylene crystals are separated from the mother liquor, and are washed by liquid meta-xylene or an extraneous wash liquid. Meta-xylene crystals are withdrawn through line 72 to storage means or the like. Mother liquor withdrawn through line 73 from crystallizer 68 and through line 74 from centrifuge 71 is pumped by pump 76 through valved line 77 either to other crystallization stages, crystallization means for the recovery of ethylbenzene, or to storage.

In an alternative system, meta-xylene can be crystallized from the mother liquor after the first cycle of para- and ortho-xylene crystallization. In this case, the valve 40a in valved line 40 is closed and mother liquor from the first ortho-xylene crystallization is flowed through valved line 78 into cooler 66 and thence through line 67 into the crystallizer 68. The cooled liquor in crystallizer 68 is seeded with meta-xylene and resultant meta-xylene crystals are separated in the usual manner. Mother liquor that is separated in the crystallizer 68 and centrifuge 71 is pumped by the pump 76 through valved line 79 to cooler 41. Para-xylene and ortho-xylene are then each crystallized from the mother liquor in an additional cycle of para- and ortho-xylene crystallizations.

The mother liquor remaining after crystallization of para-, ortho-, and meta-xylene according to our described method will contain at most about 3 to 5 percent para-xylene, 8 to 10 percent ortho-xylene, and less than 20 percent meta-xylene.

*Example 1*

A feed stock consisting of a distillate fraction of $C_8$ hydrocarbons containing 16 volume percent ortho-xylene, 33 volume percent meta-xylene, 14 volume percent para-xylene, 27 volume percent ethylbenzene, and 10 volume percent paraffins, was introduced into a cooler wherein the refrigeration was supplied by indirect cooling with liquid air. Crystallization was performed in six stages, the first two stages consisting of a cycle of para-, ortho-xylene crystallizations in which the feed was first cooled to substantially the spontaneous crystallization temperature of ortho-xylene, and para-xylene was crystallized and separated, and in which the mother liquor from the first stage was cooled to −93.5° C. and was seeded with ortho-xylene. Ortho-xylene was crystallized and separated. The mother liquor from the ortho-xylene crystallization was cooled to −89° C. and was seeded with meta-xylene, which crystallized and was separated. The para-, ortho-xylene crystallization cycle was then repeated, followed by a sixth crystallization step in which meta-xylene was separated by cooling and seeding at a crystallization temperature of −100° C. The following table illustrates the results obtained:

| Stage No. | Isomer Crystallized | Crystallization Temperature, °C. | Percent of Isomer Recovered | Cumulative Percent of Isomer Recovered |
|---|---|---|---|---|
| 1 | Para-xylene | −89 | 79 | 79 |
| 2 | Ortho-xylene | −93.5 | 46 | 46 |
| 3 | Meta-xylene | −89 | 43 | 43 |
| 4 | Para-xylene | −98.5 | 50 | 89 |
| 5 | Ortho-xylene | −103 | 50 | 73 |
| 6 | Meta-xylene | −100 | 47 | 70 |

Mother liquor from the sixth crystallization stage contained 8 volume percent of ortho-xylene, 19 volume percent of meta-xylene, 3 volume percent of para-xylene, 51 volume percent of ethylbenzene, and 19 volume percent of paraffins, this representing a recovery shown in the cumulative column above 89 percent of the para-xylene, 73 percent of the ortho-xylene and 70 percent of the meta-xylene. It can be seen from the above table that the yield of para-xylene was increased by our system from 79 percent (the total amount that can be recovered by supercooling, i. e., cooling down to the spontaneous crystallization temperature of ortho-xylene) to 89 percent, an increase in recovery of about 10 percent.

Equipment can be provided between the crystallizers and after each centrifuge to filter the mother liquor flowing therebetween so as to insure the elimination of crystals from the liquor, which crystals might otherwise interfere with proper seeding and crystallization in the subsequent crystallization step. However, in the usual course of operation the mother liquor will be warmed enough by passing through the centrifuge and subsequent lines to dissolve any crystals which may have passed through the centrifuge. Alternatively, warming means can be supplied to ensure the solution of any such crystals in the mother liquor.

*Example 2*

In this example a sample of the product of a hydroformer operation employing $C_8$ hydrocarbons in the feed was used. This feed stock contained xylene isomers in the proportions set forth in the following table:

| Component | Content, by Weight, percent |
|---|---|
| Para-xylene | 13.0 |
| Ortho-xylene | 17.9 |
| Meta-xylene | 34.8 |
| Ethylbenzene | 24.5 |
| Paraffins and other compounds | 9.8 |

Three portions of the mother liquor were cooled to a temperature of −91° C. and the separate portions were held respectively for periods of five minutes, two hours, and three hours and thirty minutes. The crystals were found in each to be substantially pure para-xylene, only a trace of other isomer being present. No marked effect from changing the holding period before separation of crystals from mother liquor was observed. The mother liquor from the three samples of feed employed in the crystallization of para-xylene was combined. One portion of the combined mother liquor was cooled to a temperature of about −89.3° C. and another to −94° C., each portion was seeded by adding a crystal of ortho-xylene, and 26 percent and 46 percent, respectively, of theoretically available ortho-xylene was obtained. The ortho-xylene was substantially pure. The ortho-xylene was carefully filtered from both portions of the mother liquor, the mother liquor was combined, cooled still further to −100° C., seeded with para-xylene and held for a period of 20 minutes whereupon a 23 percent additional yield of substantially pure para-xylene crystals was recovered, a cumulative yield of 87 percent of the total theoretically available para-xylene. The mother liquor from the para-xylene crystallization contained meta-xylene in such concentration as to have an equilibrium melting temperature of —81° C. By seeding the separated mother liquor with meta-xylene and cooling to about —100° C. to —110° C. a substantial portion, about 75 percent, of the theoretically available meta-xylene was recovered.

Example 3

A crude mixture containing 16 volume percent ortho-xylene, 23 volume percent meta-xylene, 14 volume percent para-xylene, 27 volume percent ethylbenzene and 10 volume percent paraffins was extracted with HF–BF$_3$ and 95 percent of meta-xylene was removed in substantially pure form. Para-xylene and ortho-xylene were then crystallized from the remaining solution in 4 stages, or 2 cycles, according to the table given below:

| Crystallization Stage No. | Isomer Crystallized | Crystallization Temp., ° C. | Percent of Isomer Recovered | Cumulative Percent of Isomer Recovered |
|---|---|---|---|---|
| 1 | Para-xylene | —76 | 77 | 77 |
| 2 | Ortho-xylene | —79 | 41 | 41 |
| 3 | Para-xylene | —87 | 44 | 87 |
| 4 | Ortho-xylene | —91 | 42 | 66 |

The mother liquor after the second cycle of crystallization contained 11.8 volume percent ortho-xylene, 4.3 volume percent meta-xylene, 3.9 volume percent para-xylene, 58.4 volume percent ethylbenzene, and 28.6 percent paraffins. Such mixture can be distilled to provide a highly concentrated ethylbenzene and a xylene-rich fraction. This xylene-rich fraction may be returned to the HF–BF$_3$ extraction unit and then be recycled through the fractional crystallization stages in order to obtain the final separation of substantially all of the xylene isomers.

The above alternative may be advantageous where refrigeration costs are substantial as it may be observed in the above table the extraction of meta-xylene prior to fractional crystallization permits a cumulative separation of individual para- and ortho- isomers equal to the separation that can be obtained with meta present and at 12 to 17 centigrade-degrees higher temperature.

Our process may be carried out in a succession of batch operations in a single crystallizer with recycle of mother liquor to said crystallizer. However, the present system of crystallization is especially well adapted to continuous operation, as described in the drawing, wherein cooled xylene is passed from one vessel to another as it is separated from the crystals formed during a single stage and in which centrifugation or filtration effectively completes the separation of crystals from the mother liquor. The presence of crystals of one isomer during the crystallization of another isomer will tend to seed the first isomer which would otherwise stay in the supersaturated condition in the mother liquor and will contaminate the crystals of the other isomer. For example, when para-xylene is crystallized from a feed stock identical to that employed in Example 2 in which ortho-xylene crystals are at the same time permitted to seed the mother liquor, the para-xylene purity is substantially reduced to, for example, a purity of about 50 to 60 percent.

Other methods for effecting the crystallization of supersaturated components of a liquid than the known expedient of seeding with a crystal of the supersaturated component can be employed; the other methods can include cooling, and preferably shock cooling, the solution an additional amount or subjecting the solution to violent agitations or sharp vibrations.

Having described our invention, we claim:

1. A process of recovering and separating the individual xylene isomers from a mixture of the isomers and other miscible hydrocarbons boiling within substantially the same temperature range, which process comprises recovering, prior to crystallization of metaxylene, para- and ortho-xylene in at least one sequence of crystallizations by crystallizing para-xylene from the mixture by cooling it to a temperature just above the highest spontaneous crystallization temperature of the other components of the mixture and below the equilibrium crystallization temperature of para-xylene, separating para-xylene crystals from the mother liquor, cooling the mother liquor to a temperature below the equilibrium crystallization temperature of ortho-xylene and just above the highest spontaneous crystallization temperature of the other components of the liquor and seeding the mother liquor with ortho-xylene, crystallizing and thereafter separating crystals of ortho-xylene therefrom, and cooling mother liquor from which para-xylene and ortho-xylene have been separated to below the equilibrium crystallization temperature of meta-xylene and to just above the highest spontaneous crystallization temperature of remaining other components of the second mother liquor, seeding the second liquor with a crystal of meta-xylene and thereby crystallizing and recovering meta-xylene from the mixture.

2. A process of separating and recovering individual xylene isomers in substantially pure form from a crude mixture of the isomers containing from about 10 to 20 percent para-xylene, about 15 to 25 percent ortho-xylene, about 30 to 40 percent meta-xylene, about 20 to 30 percent ethylbenzene, and about 5 to 10 percent paraffins boiling in substantially the same range as the xylenes, which process comprises cooling the said crude mixture to a temperature between about —75° and —90° C. to effect crystallization of para-xylene, separating para-xylene from the mother liquor, cooling the mother liquor to a temperature between about —85° and —95° C., seeding the cooled mother liquor with ortho-xylene, crystallizing and separating ortho-xylene from the mother liquor, cooling the mother liquor remaining after at least one cycle of the para-ortho xylene crystallization to a temperature between about —90° and —110° C. and seeding the cooled mother liquor with meta-xylene to effect crystallization of meta-xylene from the mother liquor.

3. A process of recovering and separating the individual xylene isomers from a mixture of the isomers and other miscible hydrocarbons boiling with substantially the same temperature range, which process comprises crystallizing para-xylene from the mixture by cooling it to a temperature just above the highest spontaneous crystallization temperature of the other components of the mixture and below the equilibrium crystallization temperature of para-xylene, separating para-xylene crystals from the mother liquor, cooling the mother liquor to a temperature below the equilibrium crystallization temperature of ortho-xylene and just above the highest spontaneous crystallization temperature of the other components of the liquor and seeding the mother liquor with ortho-xylene, crystallizing and separating crystals of ortho-xylene therefrom, and cooling resulting second mother liquor from which para-xylene and ortho-xylene have been separated to below the equilibrium crystallization temperature of para-xylene and to just above the highest spontaneous crystallization temperature of remaining other components of the second mother liquor, seeding the second liquor with a crystal of para-xylene, crystallizing and recovering para-xylene therefrom, cooling the resulting mother liquor to below the equilibrium crystallization temperature of ortho-xylene and to just above the highest spontaneous crystallization temperature of remaining other components of the mother liquor, seeding the cooled mother liquor with a crystal of ortho-xylene, crystallizing and recovering ortho-xylene therefrom, cooling the resulting mother liquor to below the equilibrium crystallization temperature of meta-xylene and to just above the highest spontaneous crystallization temperature of remaining other components of the mother liquor, seeding the cooled mother liquor with a crystal of meta-xylene and thereby crystallizing and recovering meta-xylene from the mixture.

References Cited in the file of this patent

UNITED STATES PATENTS

| | | |
|---|---|---|
| 2,398,526 | Greenburg | Apr. 16, 1946 |
| 2,530,978 | Mason | Nov. 21, 1950 |
| 2,622,115 | Carney | Dec. 16, 1952 |

OTHER REFERENCES

McCaulay et al.: Ind. Eng. Chem., vol. 42, pp. 2103-7 (1950).